United States Patent [19]

Neuman

[11] Patent Number: 5,747,745
[45] Date of Patent: May 5, 1998

[54] WEIGHTING DEVICE FOR BEDRIDDEN PATIENTS

[75] Inventor: Eli Neuman, Magdiel, Israel

[73] Assignee: Tedea-Huntleigh Intl. Ltd., Herzliya, Israel

[21] Appl. No.: 506,768

[22] Filed: Jul. 26, 1995

[51] Int. Cl.$^6$ ............................ G01G 19/52; G01G 19/08; G01G 19/00
[52] U.S. Cl. ........................ 177/132; 177/136; 177/144; 177/145
[58] Field of Search ................................ 177/132, 136, 177/141, 144, 145, 146

[56] References Cited

U.S. PATENT DOCUMENTS

| | | | |
|---|---|---|---|
| 4,038,709 | 8/1977 | Kerwit | 5/68 |
| 4,905,780 | 3/1990 | Goff, III | 177/136 |
| 4,974,692 | 12/1990 | Carruth et al. | 177/144 |

*Primary Examiner*—Cassandra C. Spyrou
*Assistant Examiner*—Michael J. Hayes
*Attorney, Agent, or Firm*—Edward Langer

[57] ABSTRACT

A device for attachment to a hospital bed to enable quick, easy weighing of bedridden patients, provided as a retrofit device for attachment to hospital beds which are not equipped with such devices as original equipment. The device contains a load cell in a housing, with the housing arranged for mounting to a cross-beam of the bed. A retractable support leg extends through the bottom of the housing, and when the bed is raised on the support leg, the load cell is deflected to provide a reading of the bed weight. By performing the weight measurement once without a patient, and keeping track of changes in bed sheets and linens, the value of a patient's weight can be quickly determined while the patient remains bedridden. The mechanism which raises the bed on the support leg can be provided in several embodiments, including an electric motor drive, hydraulic piston, or mechanical foot pedal.

16 Claims, 13 Drawing Sheets

1

WEIGHTING DEVICE FOR BEDRIDDEN PATIENTS

FIELD OF THE INVENTION

The present invention relates to weight-measurement scales and hospital diagnostic monitoring equipment, and more particularly, to a weight measurement device for bedridden patients which attaches to a bed for measuring a patient's weight.

BACKGROUND OF THE INVENTION

There are known weighing scales for weighing bedridden patients who are hospitalized and cannot easily stand on a conventional weighing scale. Hospital bed mechanisms have been designed to incorporate weighing systems, but since these built-in systems are intended for use as part of the original hospital bed design, they cannot be adapted to existing hospital beds.

The need to closely monitor weight variations in bedridden patients is of utmost importance in the overall medical treatment procedure. Therefore, the lack of weighing scale equipment in many hospital beds makes it difficult for medical staff to perform routine monitoring duties without disturbing the patient. Thus, the routine weighing procedure becomes a problem.

Therefore, it would be desirable to provide a device which can be adapted to existing hospital beds to enable medical personnel to measure bedridden patient weight quickly and easily.

SUMMARY OF THE INVENTION

Accordingly, it is a principal object of the present invention to overcome the disadvantages associated with existing weighing systems and provide a retrofit device for attachment to a hospital bed to enable quick, easy weighing of bedridden patients.

In accordance with the principles of the present invention, there is provided a weighing device for bedridden patients comprising:

a housing for attachment to a lower portion of a bed;

a load cell mounted at one end thereof to said housing;

means extendable from said housing to support the bed thereon, said support means being connected to said load cell at a second end thereof such that said load cell is deflected under the weight of the bed, said load cell producing an output signal representative of the bed weight.

In a preferred embodiment, the weighing scale device is provided as a retrofit device for attachment to hospital beds which are not equipped with such devices as original equipment. The inventive device contains a load cell in a housing, with the housing arranged for mounting to a cross-beam of the bed. A retractable support leg extends through the bottom of the housing, and when the bed is raised on the support leg, the load cell beams are deflected to provide a reading of the bed weight. By performing the weight measurement once without a patient, and keeping track of changes in bed sheets and linens, the value of a patient's weight can be quickly determined while he is in bed.

The mechanism which raises the bed on the support leg can be provided in several embodiments, including an electric motor drive, hydraulic piston, or mechanical foot pedal.

A feature of the invention is the provision of a collapsible knee in the support leg which raises the bed. In the event of an emergency, when the support leg is collapsed by a single push on the bed, the bed quickly returns to being mobile.

Other features and advantages of the invention will become apparent from the following drawings and description.

BRIEF DESCRIPTION OF THE DRAWINGS

For a better understanding of the invention with regard to the embodiments thereof, reference is made to the accompanying drawings in which, like numerals designate corresponding sections or elements throughout, and in which.

DETAILED DESCRIPTION OF THE PREFERRED EMBODIMENTS

Figure 1:
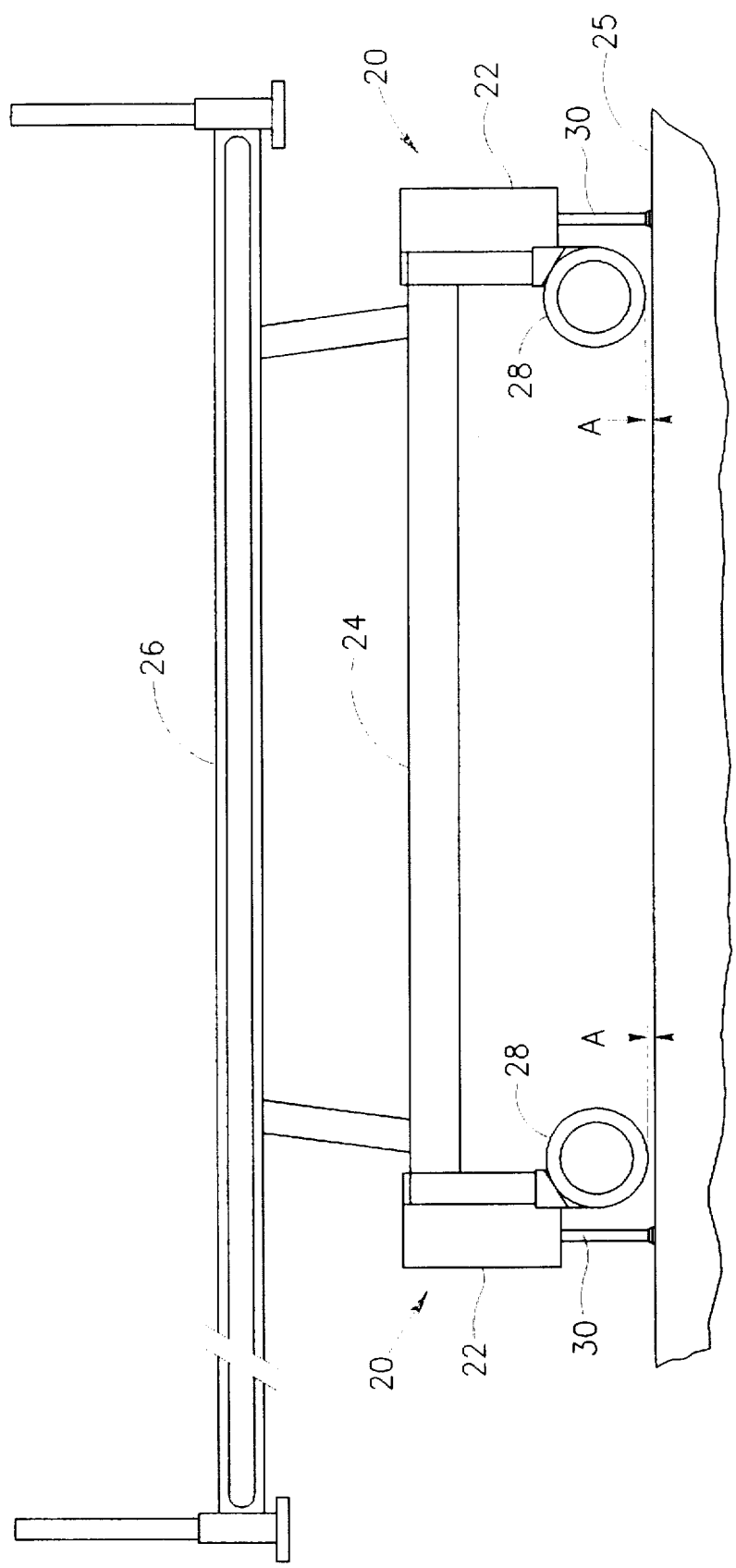
FIGS. 1–2 are, respectively, side and top views of a preferred embodiment of a weighing scale device for bedridden patients, constructed in accordance with the present invention.
Figure 2:
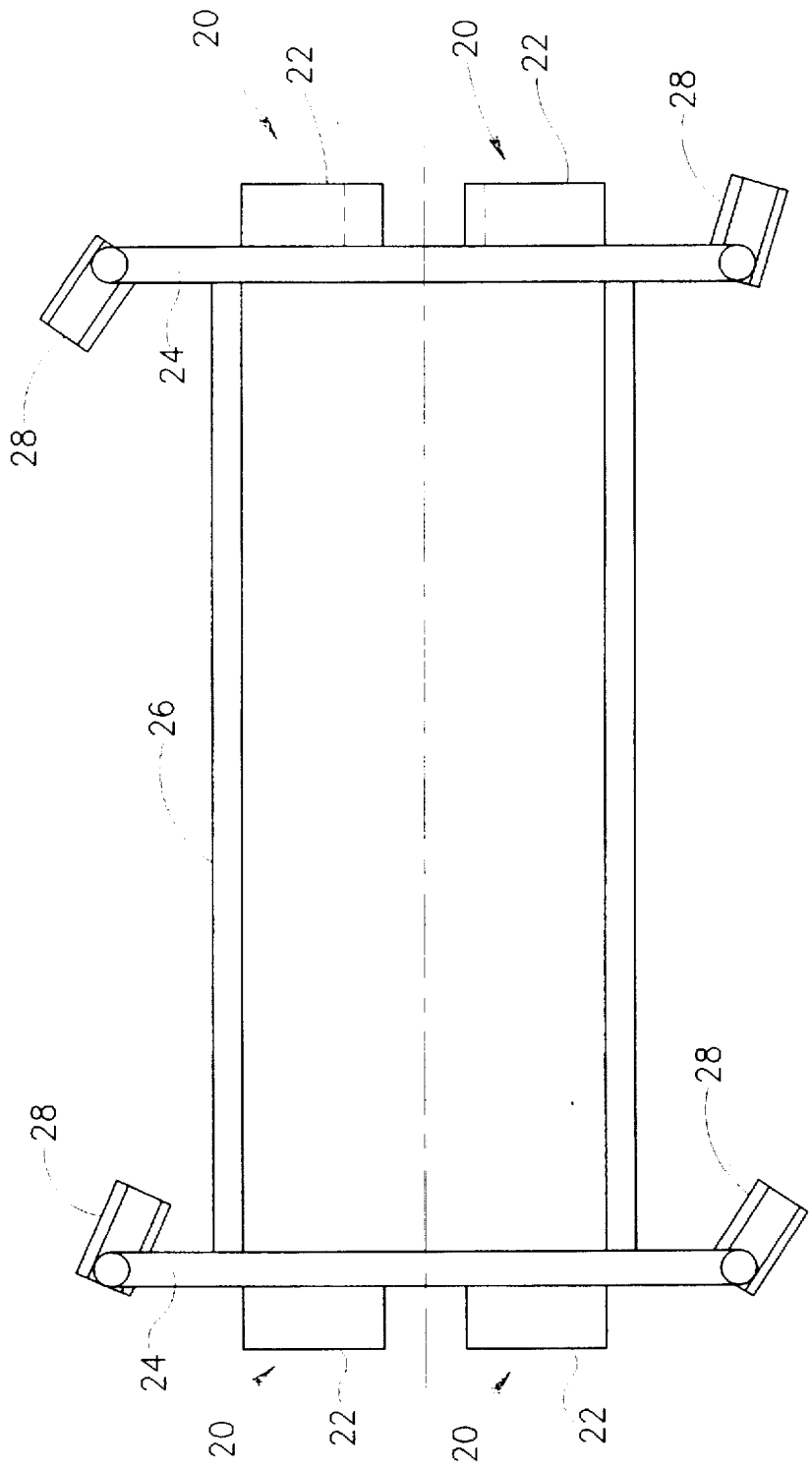

Referring now to FIGS. 1–2, there are shown, respectively, side and front views of a weighing scale device 20 for bedridden patients, constructed and operated in accordance with the principles of the present invention. Device 20 is arranged as a housing 22 for mounting at four points on a bed frame 24, which supports a bed 26. A set of rolling casters 28 is attached to bed frame 24, making it normally mobile on floor 25.

As described further herein, device 20 is designed with a retractable support leg 30, which extends through the bottom of housing 22, to raise the bed 26 off casters 28, by a gap marked A. When raised, the entire weight of bed 26 rests on four support legs 30, provided by the four devices 20 mounted on frame 24. Support leg 30 is provided with self-adjusting feet 31 (FIG. 3), and a locking nut 34 enabling final height adjustment of bed 26. Several alternative embodiments of device 20 are shown and described in the drawings, each for raising and lowering the bed.

Figure 3:
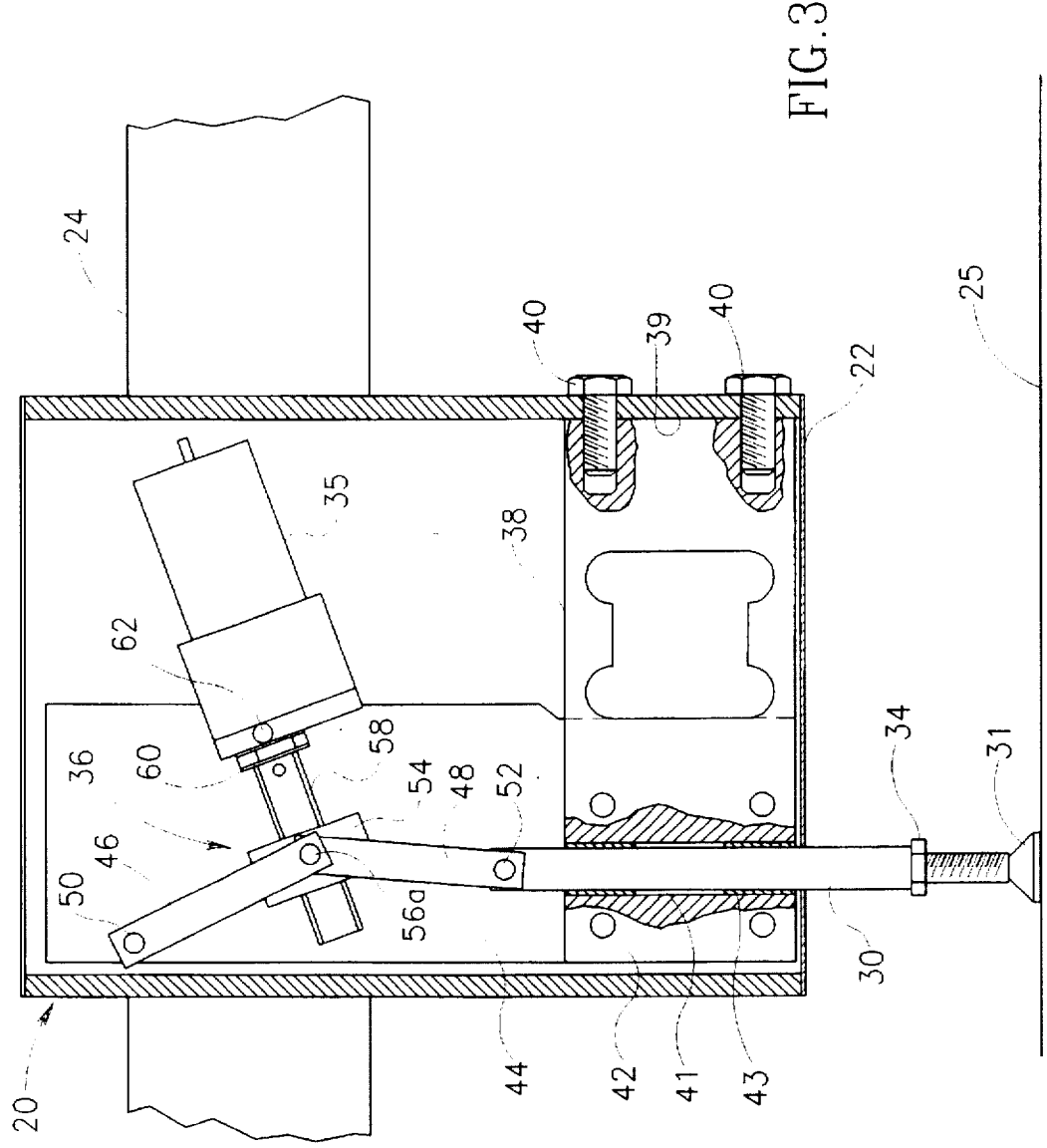
FIGS. 3–4 are respectively, cross-sectional side and end views of the device of FIG. 1, featuring a motor drive.
Figure 4:
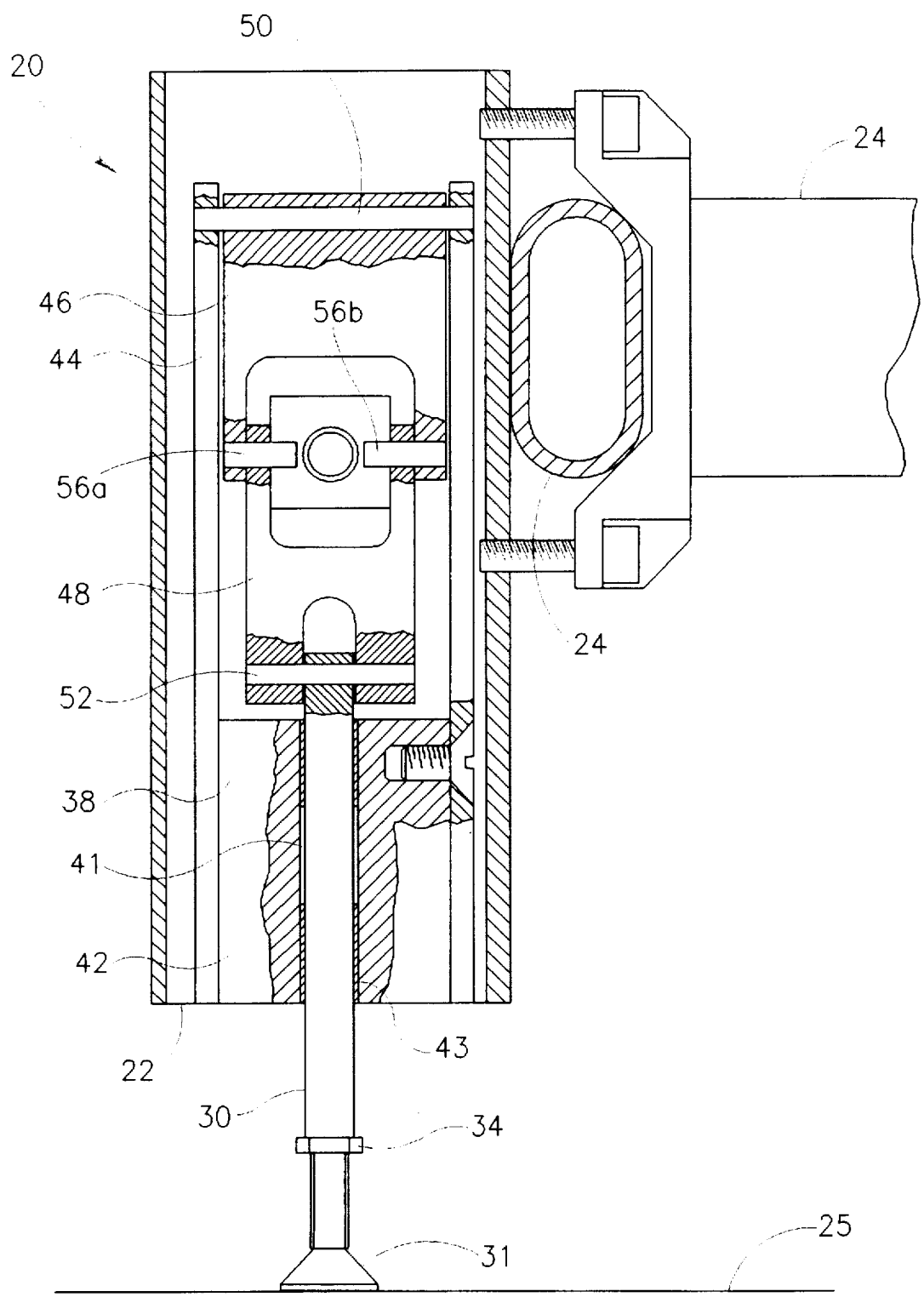

In FIGS. 3–4 there are shown, respectively, cross-sectional side and end views of device 20 of FIG. 1, featuring an electric motor 35 and drive arrangement 36 for raising the bed 26. Housing 22 contains a load cell 38 mounted therein at its end 39 by screws 40. Load cell 38 has a borehole 41 formed vertically therethrough at its opposite end 42. Support leg 30 extends through borehole 41 of load cell 38 in sliding fashion, by virtue of linear bearings 43. Extending vertically from the end 42 of load cell 38 on the sides thereof are a pair of opposing plates 44, defining a space therebetween. Motor 35 and drive arrangement 36 are pivotally mounted on pins extending through this space.

Drive arrangement 36 comprises an articulated set of upper and lower linkages 46, 48 which pivot on pins 50, 52. A drive nut 54 is pivotably supported on pins 56a–b which join linkages 46, 48. Drive nut 54 threadably engages a drive screw 58 mounted on a shaft 60 of motor 35. Motor 35 is pivotally mounted between plates 44 on pin 62. Lower linkage 48 is pivotally connected at its end to the upper end of support leg 30. Thus, when drive screw 58 rotates under power of motor 35, drive nut 54 forces upper and lower linkages to adjust position, to raise or lower support leg 30, depending on the motor rotation direction.

Referring to FIGS. 1–4, as support leg 30 is lowered and bed 26 is raised thereon, the bed weight is shifted to support leg 30. The bed weight measurement is ultimately determined by load cell 38 which develops a voltage corresponding to the bed weight. Load cell 38 typically contains a strain gage (not shown) in the form of fine wires arranged in a pattern and cemented to a location on load cell 38 that will be subjected to physical strain. The fine wires have a certain resistance, when the metal to which it is cemented is not under strain. When the metal is distorted, the attached wires, due to their elastic properties, will be stretched. This in turn reduces the wire cross-section and increases its length so that the resistance within the wires is changed. The differences in resistance are converted to changes in voltage through the use of a basic bridge circuit. This configuration is commonly used in high accuracy load cells, although other configurations may also be utilized.

By performing a bed weighing measurement without a patient, and then keeping track of bed sheet and linen changes, a patient's weight can be quickly determined while he is in the bed.

Figure 5:
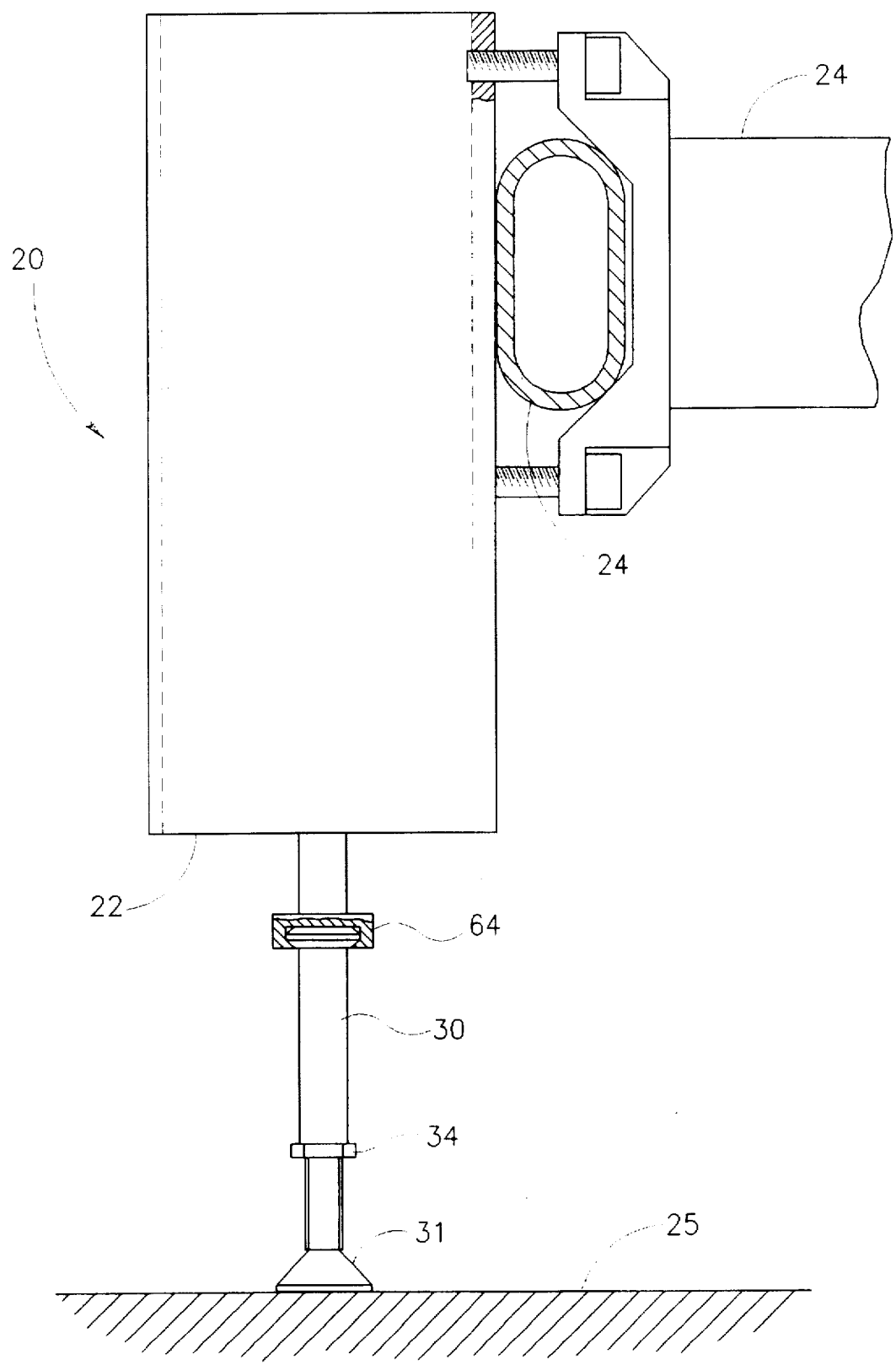
FIG. 5 is an end view of the device of FIG. 1, showing a support piston with a collapsible knee construction.

Referring now to FIG. 5, there is shown a support leg 30 featuring a collapsible knee construction. A spring-like coupling 64 is provided to allow for emergency collapse of the support legs 30, restoring bed 26 to a rolling condition on casters 28. Thus, when bed 26 has been raised on support legs 30, it can be immediately restored to a rolling condition by pushing forward or in any other direction, collapsing knee coupling 64.

Figure 6:
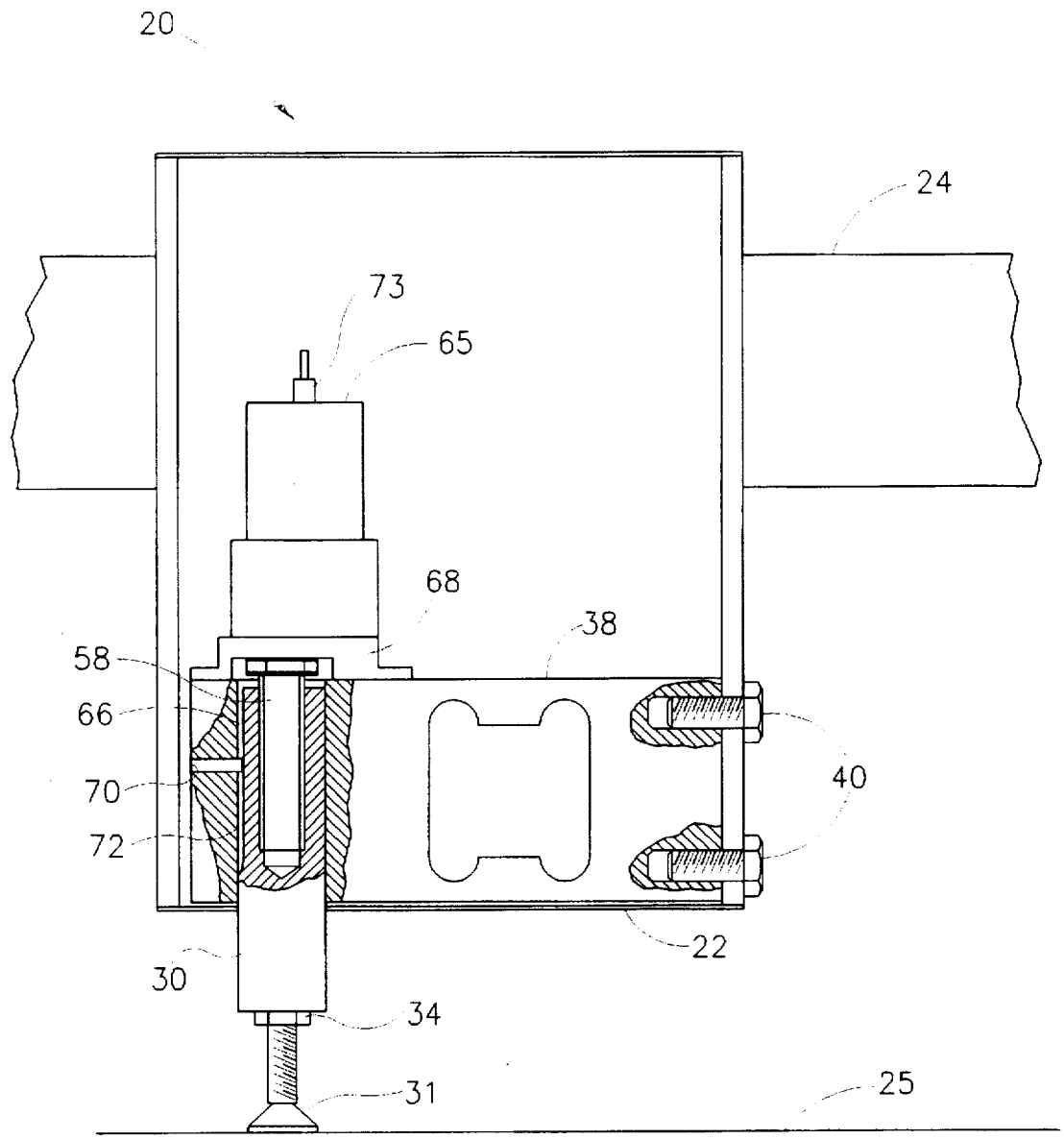
FIG. 6 is a cross-sectional view of an alternative embodiment, featuring a direct-drive motor for raising the bed.

In FIG. 6 there is shown a cross-sectional view of an alternative bed weighing device embodiment, featuring a direct-drive motor 65 for raising bed 26. In this arrangement, drive screw 58 is threadably engaged in a threaded borehole 66 formed in support leg 30. Motor 65 is mounted to load cell 38 by a bracket 68. A fixed pin 70 engages a slot 72 formed in support leg 30, to prevent it from rotating with drive screw 58 rotation.

As with the previous embodiment, operation of drive motor 65 rotates drive screw 58, raising bed 26 on support leg 30, for providing weight measurement via the load cell 38 reading.

A safety feature can be provided in this embodiment to determine if motor 65 operation is normal. As support leg 30 is lowered by motor rotation, the load cell 38 weight reading will increase depending on motor 65 position. A rotary sensor, such as An encoder or resolver 73 can be provided on the shaft of motor 65 to check its position against the weight reading on load cell 38. A graph of these parameters will show a particular curvature as the weight reading increases. If this curvature is not detected, there may be a problem with motor 65 operation, since support leg 30 may be resting on a soft surface, e.g. a foot, hand or finger. In such as case, motor rotation is aborted or reversed as necessary.

Figure 7:
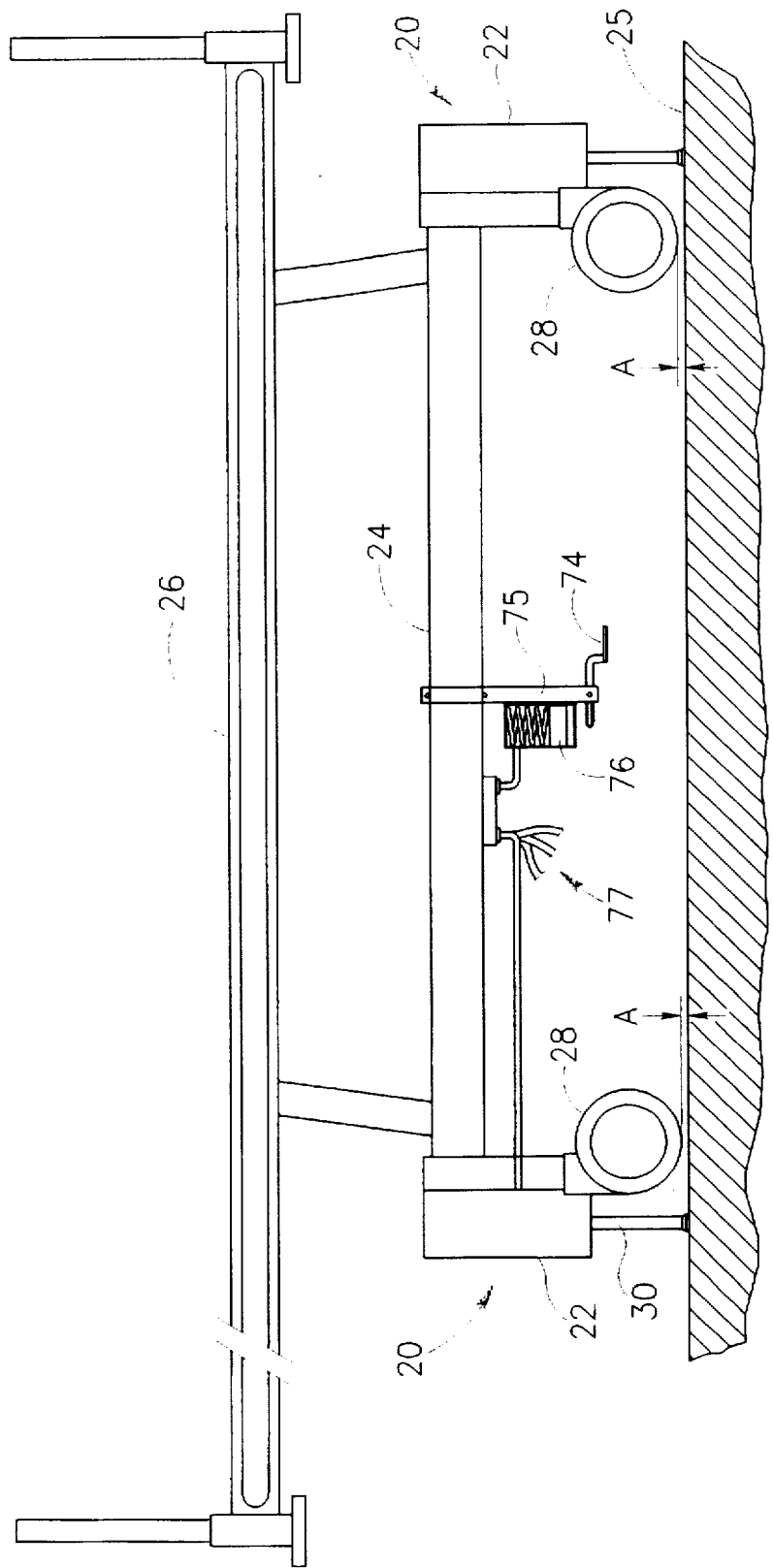
FIG. 7 is a side view of an alternative embodiment, featuring an hydraulic actuator arrangement for raising the bed.

In FIG. 7, there is shown a side view of another alternative embodiment, featuring an hydraulic actuator arrangement for raising bed 26 on support legs 30. In this arrangement, a foot pedal 74 is pivotably mounted on a plate 75 under bed 26, and operates to pump hydraulic fluid in a master cylinder 76 into a hydraulic circuit 77 connected to individual hydraulic actuators 78a–d which can be operated to raise or lower support legs 30.

Figure 8:
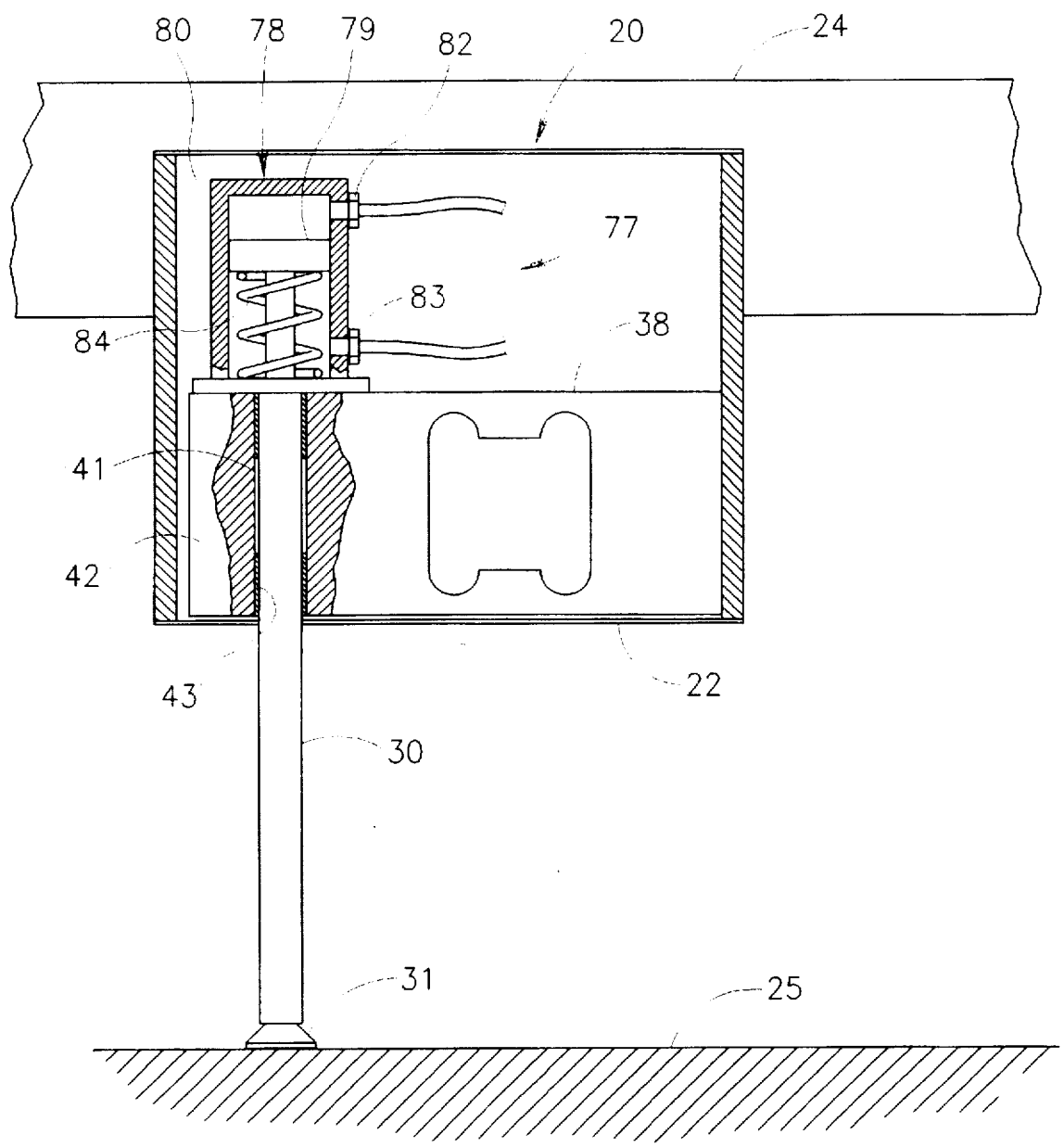
FIG. 8 a cross-sectional view of each hydraulic actuator.
Figure 9:
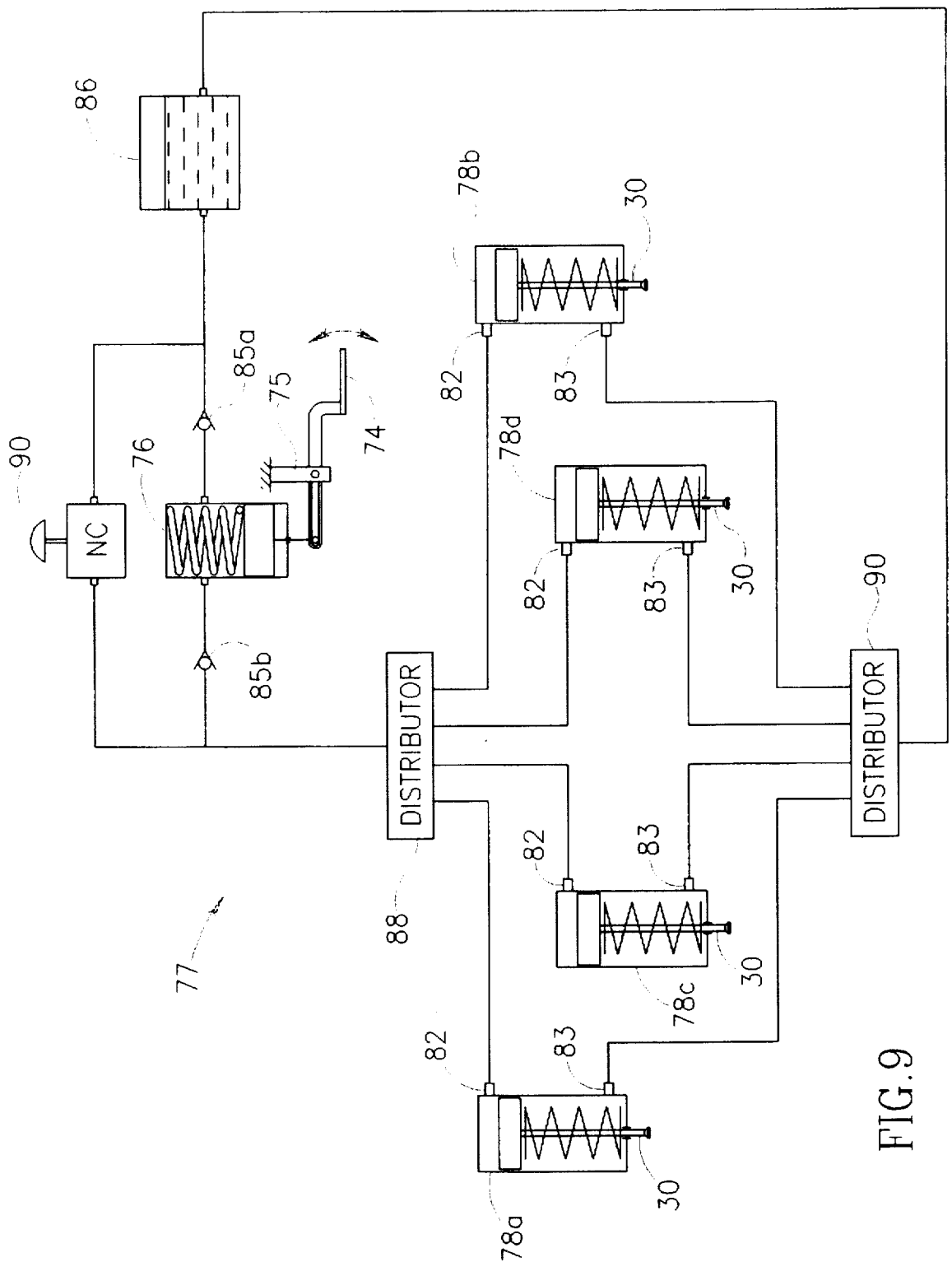
FIG. 9 is a schematic diagram of an hydraulic circuit arrangement for the hydraulic actuators on the four bed corners.

FIGS. 8–9 show, respectively, an individual hydraulic actuator 78 arrangement and a schematic diagram of an hydraulic circuit arrangement for hydraulic actuators 78a–d on the four corners of bed 26. Hydraulic actuator 78 comprises a piston 79 mounted in a cylinder 80 between inlet and outlet ports 82–83. Piston 79 moves within cylinder 80 against d spring 84 which compresses and expands against the hydraulic pressure in circuit 77. When support leg 30 is lowered, bed 26 is raised thereon, for providing weight measurement via the load cell 38 reading.

The hydraulic circuit schematic of FIG. 9 shows master cylinder 76 which is connected via two one-way valves 85a–b to a reservoir 86 and a distributor 88. A push-button release valve 90 is connected across master cylinder 76, to allow for pressure release, when actuators 78a–d are lowered. Distributor 88 is connected to the inlet ports 82 of each of actuators 78a–d, and a second distributor 90 is connected to outlet ports 83 of each of actuators 78a–d, with return connection to reservoir 86.

As previously stated, when foot pedal is depressed, hydraulic fluid is pumped from master cylinder 76 via hydraulic circuit 77 to individual hydraulic actuators 78a–d, to lower support legs 30. Upon depression of release button 90, springs 84 act to retract support legs 30 to their initial position.

Figure 10:
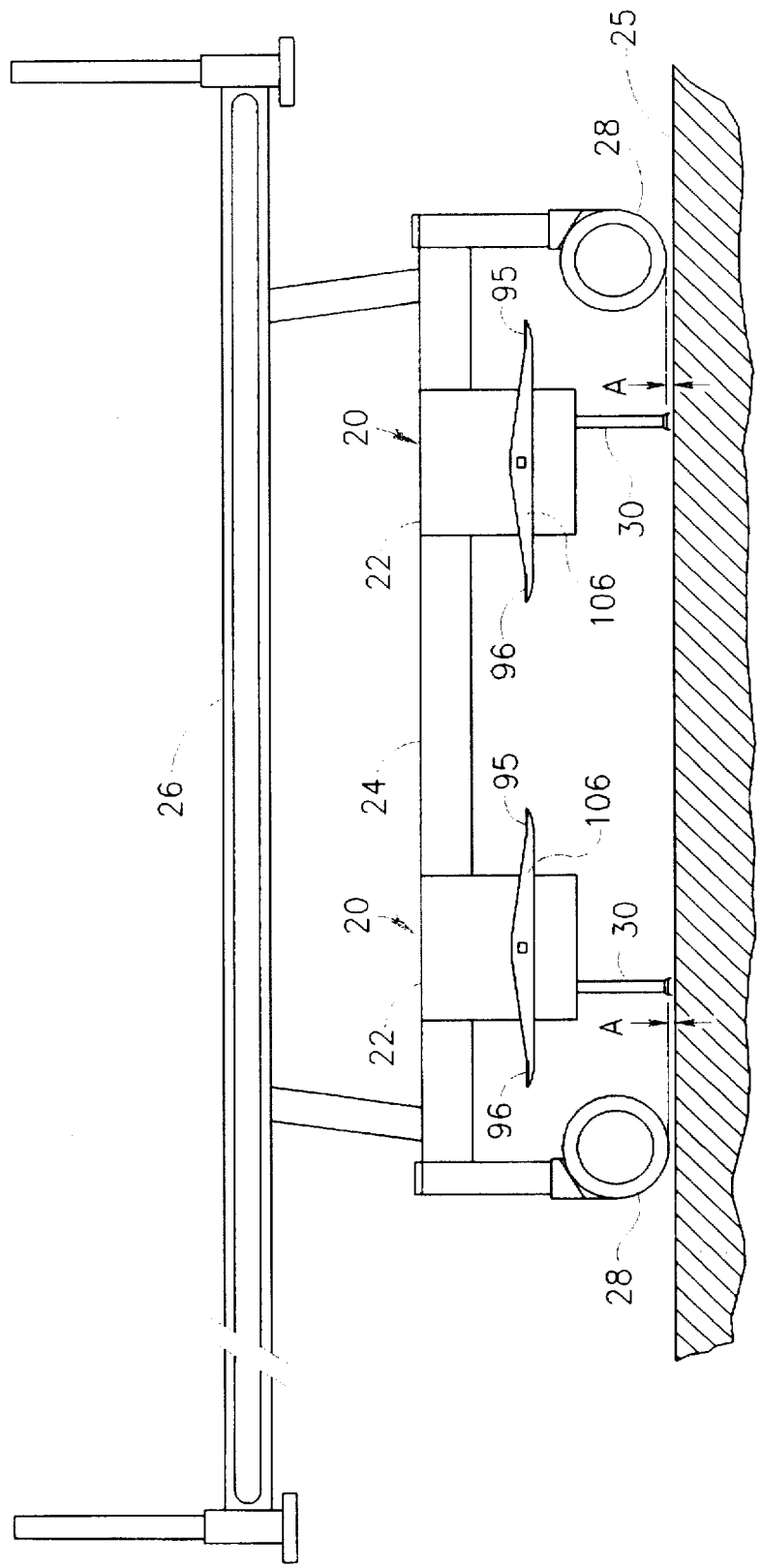
FIGS. 10–11 are, respectively, side and top views of an alternative embodiment, featuring mechanical foot pedals for raising the bed.
Figure 11:
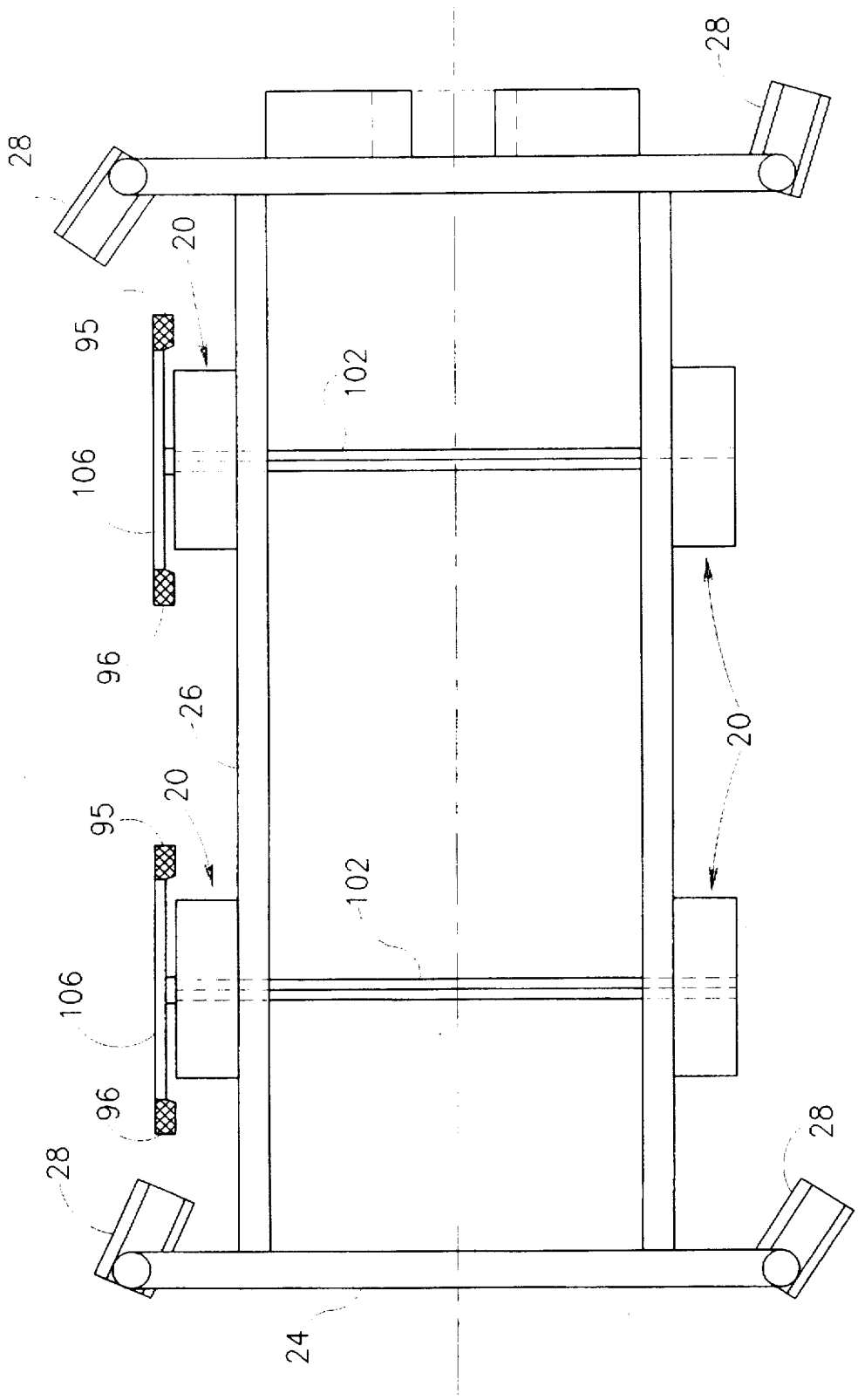

Referring now to FIGS. 10–11, there are shown respectively, side and top views of an alternative embodiment, featuring mechanical foot pedals 95–96 for raising bed 26. As shown respectively in the cross-sectional front and top views of FIGS. 12–13, in this arrangement, a set of linkages 98, 99, 100 and 101 is provided for mechanically connecting a shaft 102 with support leg 30. Linkages 98–101 are supported by pins 103 between a pair of plates 105 mounted to the sides of load cell 38. Plates 105 also support shaft 102, which is formed with square ends and has mounted thereon a bar 106 joining each of foot pedals 95–96.

Figure 12:
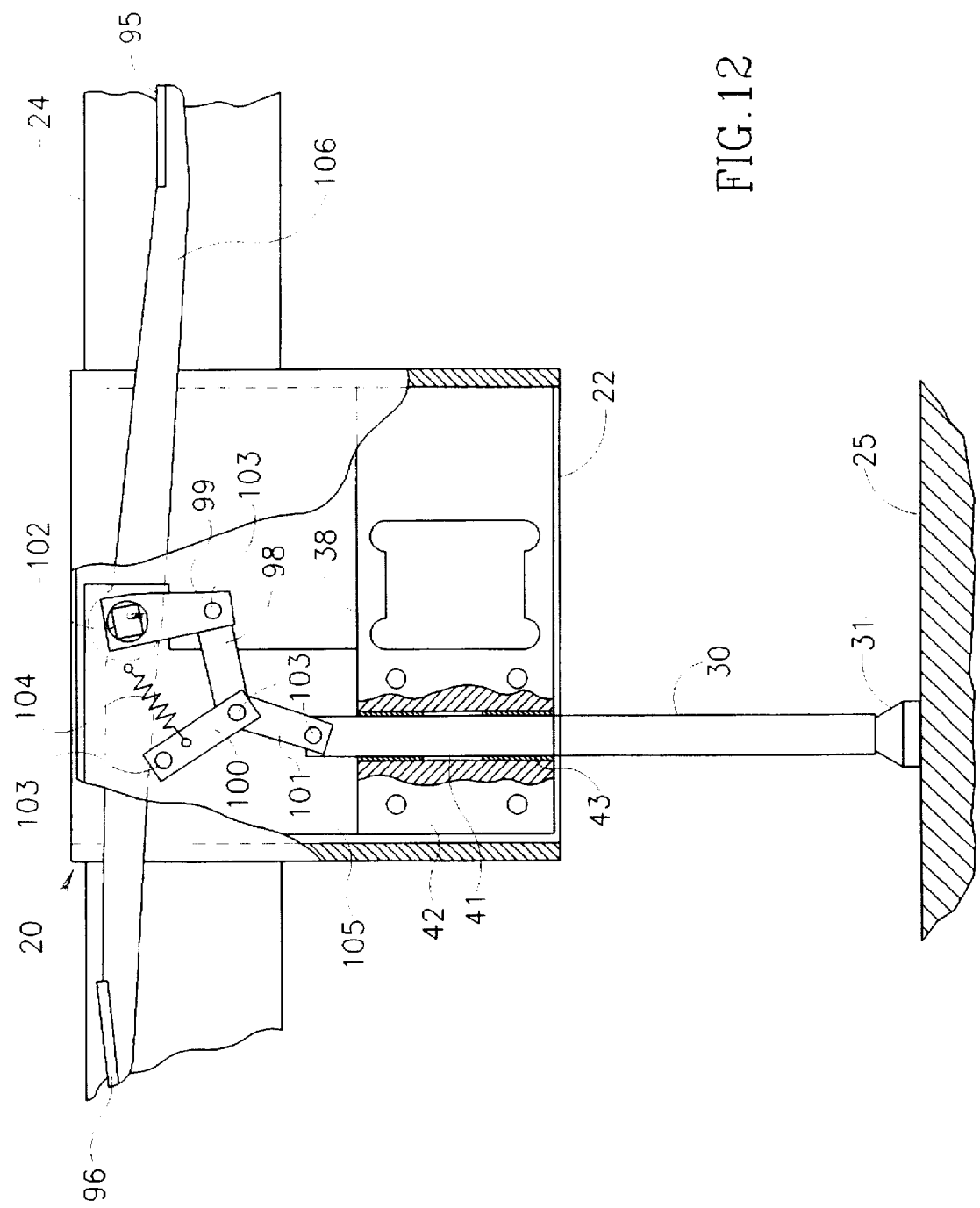
FIGS. 12–13 are, respectively, cross-sectional front and top views of the mechanical foot pedal arrangement.
Figure 13:
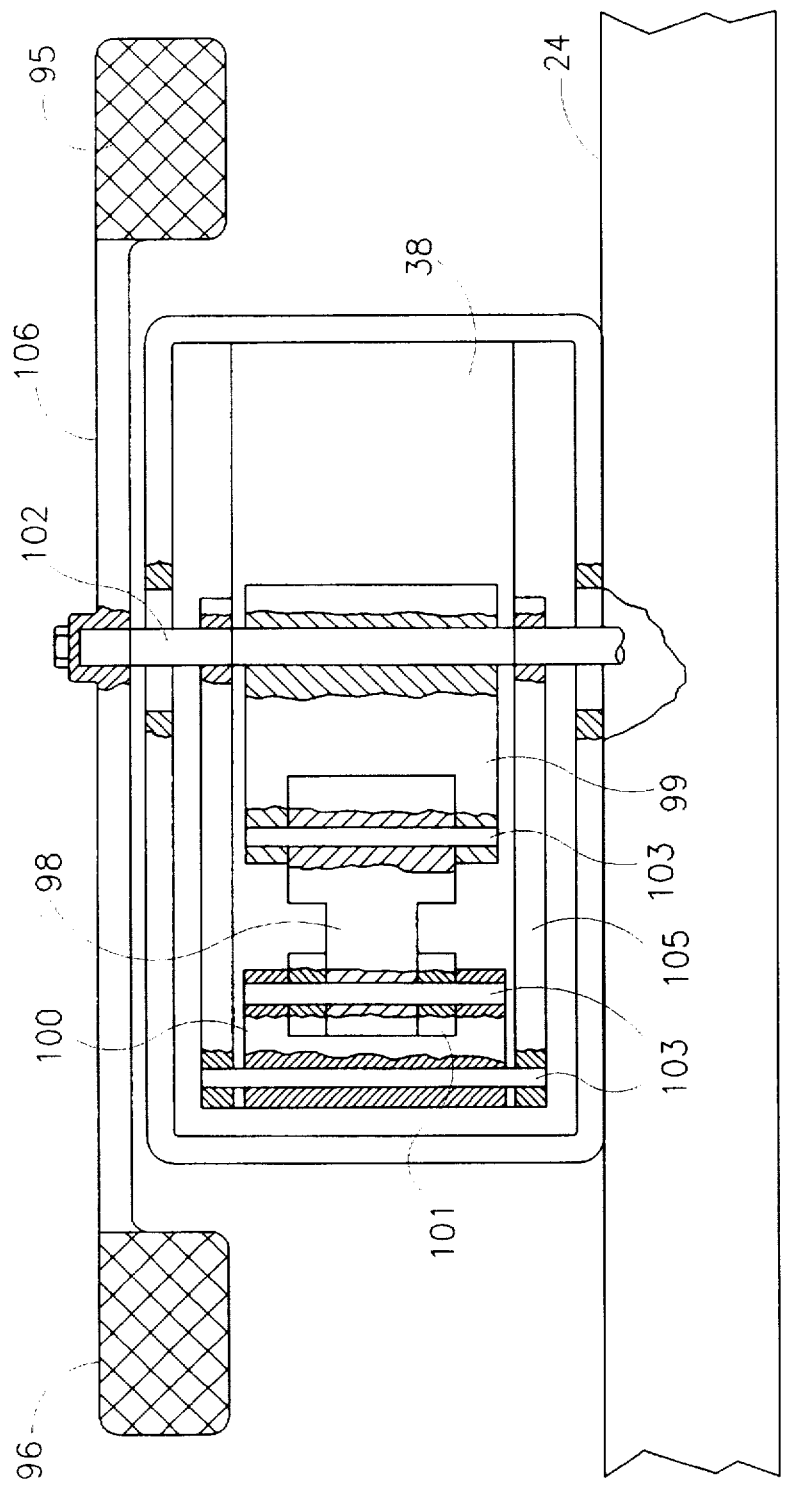

As will be noted by inspection of FIGS. 12–13, actuator pedal 95 is displaced from shaft 102 by a greater distance than pedal 96. Thus, depression of actuator pedal 95 causes rotation of square shaft 102 clockwise with a greater moment of force, such that linkage 98 moves to the left, to lower support leg 30. When support leg 30 is lowered, bed 26 is raised thereon, for providing weight measurement via the load cell 38 reading.

Depression of release pedal 96 causes counter-clockwise rotation, such that linkage 98 moves to the right, to raise support leg 30. A tension spring 104 assists linkage 99 to retract support leg 30 when release pedal 96 is depressed.

Having described the invention with regard to certain specific embodiments, it is to be understood that the description is not meant as a limitation, since further modifications may now suggest themselves to those skilled in the art, and it is intended to cover such modifications as fall within the scope of the appended claims.

I claim:

1. A weighing device for bedridden patients comprising:
    a housing for attachment to a lower portion of a bed;

a load cell mounted at one end thereof to said housing;

means retractably extendable from said housing to support the bed thereon, said support means being connected to said load cell at a second end thereof such that said load cell is deflected under the weight of the bed when said support means is extended so as to carry said bed weight, said load cell being unloaded when said support means is retracted, said load cell producing an output signal representative of the bed weight.

2. The device of claim 1, wherein said load cell is formed with a borehole extending therethrough at one end thereof, said support means extending in sliding fashion through said borehole.

3. The device of claim 2, wherein said support means comprises a support leg extending through said borehole.

4. The device of claim 3 wherein said support leg comprises an extendable end portion for varying its length.

5. The device of claim 3 wherein said support leg has a collapsible knee which folds by pushing the bed laterally.

6. The device of claim 1 wherein said extendable support means comprises a support leg connected to a mechanism for extending and retracting it from a lower end of said housing.

7. The device of claim 6 wherein said mechanism comprises a motor for providing a drive screw with rotational power, said drive screw being threaded in a drive nut mechanically connected to linkages connected to said support leg, for lowering and raising said support leg in accordance with said motor rotation.

8. The device of claim 6 wherein said mechanism comprises a motor for providing a drive screw with rotational power, said drive screw being connected directly to said support leg, for lowering and raising said support leg in accordance with said motor rotation.

9. The device of claim 6 wherein said mechanism comprises a hydraulic actuator including a spring-loaded hydraulic piston.

10. The device of claim 6 wherein said mechanism comprises a mechanical foot pedal attached to a shaft having square ends which are connected to a set of linkages for raising and lowering said support leg.

11. A method of weighing bedridden patients comprising the steps of:

attaching a housing to a lower portion of a bed;

providing a load cell mounted at one end thereof to said housing; and retractably extending a support leg from said housing to support the bed thereon, said support leg being connected to said load cell at a second end thereof such that said load cell is deflected under the weight of the bed when said support means is extended so as to carry said bed weight, said load cell being unloaded when said support means is retracted said load cell producing an output signal representative of the bed weight.

12. The method of claim 11 wherein said extending step comprises providing a motor for rotating a drive screw, said drive screw being threaded in a drive nut mechanically connected to linkages connected to said support leg, for lowering and raising said support leg in accordance with said motor rotation.

13. The method of claim 11 wherein said extending step comprises providing a motor for rotating a drive screw, said drive screw being connected directly to said support leg, for lowering and raising said support leg in accordance with said motor rotation.

14. The method of claim 11 wherein said extending step comprises providing a hydraulic actuator including a spring-loaded hydraulic piston for extending and retracting said support leg from a lower end of said housing.

15. The method of claim 11 wherein said extending step comprises providing a mechanical foot pedal attached to a shaft having square ends which are connected to a set of linkages for raising and lowering said support leg.

16. A weighing device for bedridden patients comprising:

a housing for attachment to a lower portion of a bed;

a load cell mounted at one end thereof to said housing;

means retractably extendable from said housing to support the bed thereon, said support means being connected to said load cell at a second end thereof such that said load cell is deflected under the weight of the bed when said support means is extended so as to carry said bed weight, said load cell being unloaded when said support means is retracted, said load cell producing an output signal representative of the bed weight, wherein said load cell is formed with a borehole extending therethrough at one end thereof, said support means extending in sliding fashion through said borehole.

* * * * *